United States Patent
Maman et al.

(10) Patent No.: US 9,135,297 B2
(45) Date of Patent: Sep. 15, 2015

(54) DATABASE TRANSLATION SYSTEM AND METHOD

(75) Inventors: David Maman, Tel Aviv-Jaffa (IL); Yuli Stremovsky, Petah Tiqwa (IL)

(73) Assignee: GREEN SQL LTD., Tel Aviv (IL)

( * ) Notice: Subject to any disclaimer, the term of this patent is extended or adjusted under 35 U.S.C. 154(b) by 0 days.

(21) Appl. No.: 13/698,055

(22) PCT Filed: May 17, 2011

(86) PCT No.: PCT/IB2011/052147
§ 371 (c)(1),
(2), (4) Date: Nov. 15, 2012

(87) PCT Pub. No.: WO2011/145044
PCT Pub. Date: Nov. 24, 2011

(65) Prior Publication Data
US 2013/0060803 A1    Mar. 7, 2013

Related U.S. Application Data

(60) Provisional application No. 61/345,165, filed on May 17, 2010.

(51) Int. Cl.
*G06F 7/00* (2006.01)
*G06F 17/30* (2006.01)

(52) U.S. Cl.
CPC .............................. *G06F 17/30427* (2013.01)

(58) Field of Classification Search
CPC ................................................ G06F 17/30427
See application file for complete search history.

(56) References Cited

U.S. PATENT DOCUMENTS

| | | |
|---|---|---|
| 5,257,366 A | 10/1993 | Adair et al. |
| 5,428,737 A | 6/1995 | Li et al. |
| 5,924,089 A | 7/1999 | Mocek et al. |
| 5,987,452 A | 11/1999 | Kung |
| 6,009,422 A | 12/1999 | Ciccarelli |
| 6,347,315 B1 | 2/2002 | Kiyoki et al. |
| 2003/0208509 A1* | 11/2003 | Komine et al. ............... 707/200 |
| 2004/0024720 A1* | 2/2004 | Fairweather .................... 706/46 |
| 2004/0230427 A1* | 11/2004 | Reefman et al. ............. 704/225 |
| 2004/0267760 A1* | 12/2004 | Brundage et al. ............. 707/100 |
| 2005/0154742 A1* | 7/2005 | Roth et al. ..................... 707/100 |
| 2005/0192844 A1* | 9/2005 | Esler et al. ......................... 705/3 |
| 2007/0038609 A1* | 2/2007 | Wu ................................... 707/3 |
| 2008/0177748 A1* | 7/2008 | Rondot ........................... 707/10 |
| 2008/0275853 A1* | 11/2008 | Vail ................................... 707/3 |
| 2008/0288474 A1* | 11/2008 | Chin et al. ........................ 707/4 |

(Continued)

FOREIGN PATENT DOCUMENTS

EP    0855658 A1    7/1998

OTHER PUBLICATIONS

IPER for parent PCT application PCT/IB2011/052147, mailed on Nov. 20, 2012.

(Continued)

*Primary Examiner* — Robert Beausoliel, Jr.
*Assistant Examiner* — Nicholas Allen
(74) *Attorney, Agent, or Firm* — Dvorah Graeser; Graeser Associates International Inc

(57) ABSTRACT

A system and method for translating database queries across a plurality of different database platforms, regardless of the database protocol and/or structure according to which the database operates.

15 Claims, 9 Drawing Sheets

(56) References Cited

U.S. PATENT DOCUMENTS

| | | | |
|---|---|---|---|
| 2009/0249125 A1* | 10/2009 | Bhatawdekar et al. | 714/39 |
| 2009/0281790 A1* | 11/2009 | Travieso et al. | 704/8 |
| 2010/0070448 A1* | 3/2010 | Omoigui | 706/47 |
| 2010/0076612 A1* | 3/2010 | Robertson | 700/286 |
| 2010/0121869 A1* | 5/2010 | Biannic | 707/759 |
| 2011/0010379 A1* | 1/2011 | Gilderman et al. | 707/759 |
| 2011/0078166 A1* | 3/2011 | Oliver et al. | 707/760 |

OTHER PUBLICATIONS

Search Report for parent PCT application PCT/IB2011/052147, mailed on Sep. 6, 2011.

Bernus et al, Nov. 6, 1990, Knowledge based architecture to integrate heterogeneous distributed information systems, Proceedings of the International Conference on Tools for Artificial Intelligence, pp. 682-689.

Juric et al, Jun. 7, 2004, Software architectural style for interoperable databases, Information Technology Interfaces, 26th Annual conference on CAVTAT, pp. 159-166.

Marenco et al, Sep. 1, 2009, Automated Database Mediation Using Ontological Metadata Mappings, JAMIA, vol. 16, No. 5, pp. 723-737.

* cited by examiner

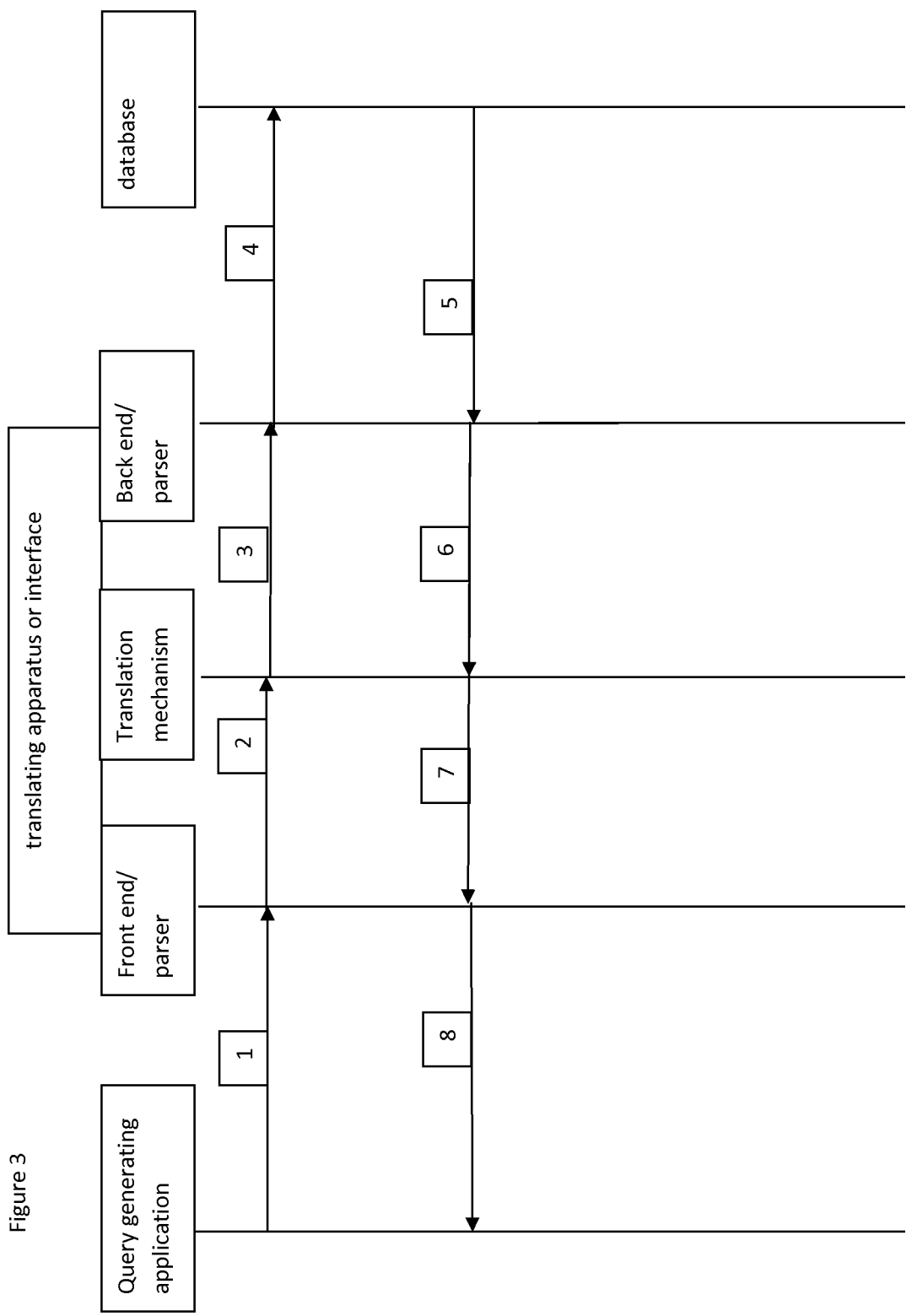

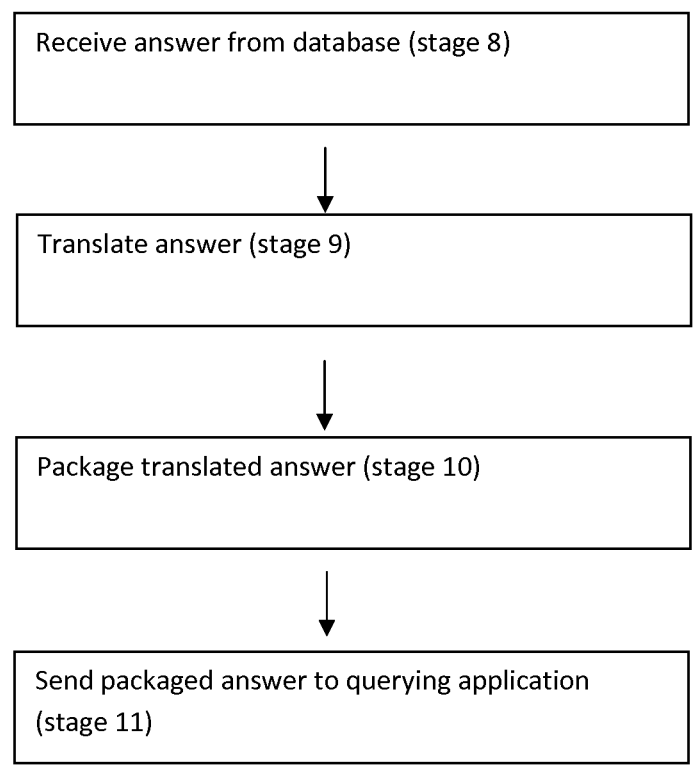
Figure 4 (con't)

DATABASE TRANSLATION SYSTEM AND METHOD

FIELD OF THE INVENTION

The present invention is of a system and method for database translation and in particular, such a system and method in which a front end translates queries into a plurality of different database protocols.

BACKGROUND OF THE INVENTION

Relational databases, and their corresponding management systems, are very popular for storage and access of data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

Typically, such databases are accessible through queries in SQL, Structured Query Language, which is a standard language for interactions with such relational databases. An SQL query is received by the management software for the relational database and is then used to look up information in the database tables.

However, software operating such relational databases typically produces queries which cannot be readily understood and analyzed across different specific software platforms, even if all of the software platforms communicate according to SQL. This lack of cross-communication is clearly inefficient, as it prevents different databases operated by different software platforms from readily communicating with each other.

The problem becomes more acute when other types of databases are considered, as not all databases currently implemented are relational databases. These different types of databases have markedly different structures, not only different protocol languages for communication, and hence require complete reconstruction of database queries if such queries were to be made across database types. Non-limiting examples of different types of databases include 3D databases, flat file databases, hierarchical databases, object databases and so forth.

Various attempts have been made to overcome this problem. For example, U.S. Pat. No. 5,257,366 teaches a method for interoperability between different relational database software platforms, being accessed according to SQL queries which are converted to an executable form before being used to access the database. Even with these limitations, the method is limited to replacing certain aspects of queries that were implementation specific with more general forms, but does not provide a complete translation solution.

U.S. Pat. No. 5,428,737 teaches a method for translation between SQL and graphically represented queries. The graphically represented query is divided into components and can then be translated to SQL by using linked data structures. The graphically represented queries are easier for human users to construct and understand; however, the taught method does not relate to translation between different database query protocols.

Similarly, U.S. Pat. No. 5,924,089 relates to translation of natural language queries to SQL queries, again for the convenience of human users; however, the taught method does not relate to translation between different database query protocols.

U.S. Pat. No. 6,009,422 teaches a method for translating database queries of different types by using a common general query language. The accessing application, or client, must use this common general query language. Therefore, the method does not solve the problem of complete translation between different database protocols and would require the database clients to be changed.

U.S. Pat. No. 6,347,315 teaches a method for selecting the most compatible database for performing a query; translation is also included, but only once the most compatible database has been selected.

SUMMARY OF THE INVENTION

There is thus an unmet need for, and it would be highly useful to have, a system and method for translating database queries so that such queries can be used to access different database operating according to different protocols, and even having different basic structures.

The present invention overcomes the deficiencies of the background art by providing a system and method for translating database queries across a plurality of different database platforms, regardless of the database protocol and/or structure according to which the database operates.

According to some embodiments of the present invention, the system and method provide a plurality of front ends for communicating with requesting applications, and a plurality of back ends, for communicating with a particular database type. Each such front end is preferably connected to a particular port or address, such that the requesting application is able to send requests for data to the relevant port and/or address for the front end that supports communication with the particular database type, language, protocol or software that is suitable for the requesting application. Similarly, each back end preferably receives data through a particular port or address from a particular database type, language, protocol or software and is able to communicate with the database according to its requirements.

The translator receives the query to the front end from a source application, translates it and passes it to the back end, which then transmits it to the database, optionally after some type of preparation that is required for the database according to the particular type, language, protocol or software. In reverse, the back end receives the results from the database, passes them to the translator, which translates the results. The translated results are then passed back to the application using the front end to which it is connected, which optionally prepares the results as necessary and then transmits them to the requesting application.

According to other embodiments of the present invention, the translator may optionally manipulate the query, with or without translation. For example, if the query features a binary attachment, the binary data is typically not translated. Instead, preferably the raw data is written to the database, more preferably with a message indicating the nature of the raw data and the application or mechanism for reading such raw data, so that the raw data may also be read from the database. Another non-limiting example in which manipulation is preferably performed is for a chained query, which is preferably decomposed to a plurality of smaller queries. Each query is then optionally translated separately.

U.S. Pat. No. 5,987,452 teaches a query translation system for translating between different database query protocols. However, the system centralizes such translation, with a central translating facility at a primary computing platform that receives all database queries, translates them, and passes them to multiple subsidiary databases. The taught system does not feature the provision of multiple front ends, each with its own port and/or address, for receiving queries from particular requesting applications according to specific protocols and/or languages and/or software. Furthermore, the taught system does not feature manipulation of queries and/or results, with or without translation.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a flow diagram of an exemplary, illustrative method for operation of a translating apparatus according to at least some embodiments of the present invention;

DESCRIPTION OF THE PREFERRED EMBODIMENTS

The present invention is of a system and method for translating database queries across a plurality of different database platforms, regardless of the database protocol and/or structure according to which the database operates.

Figure 1A:
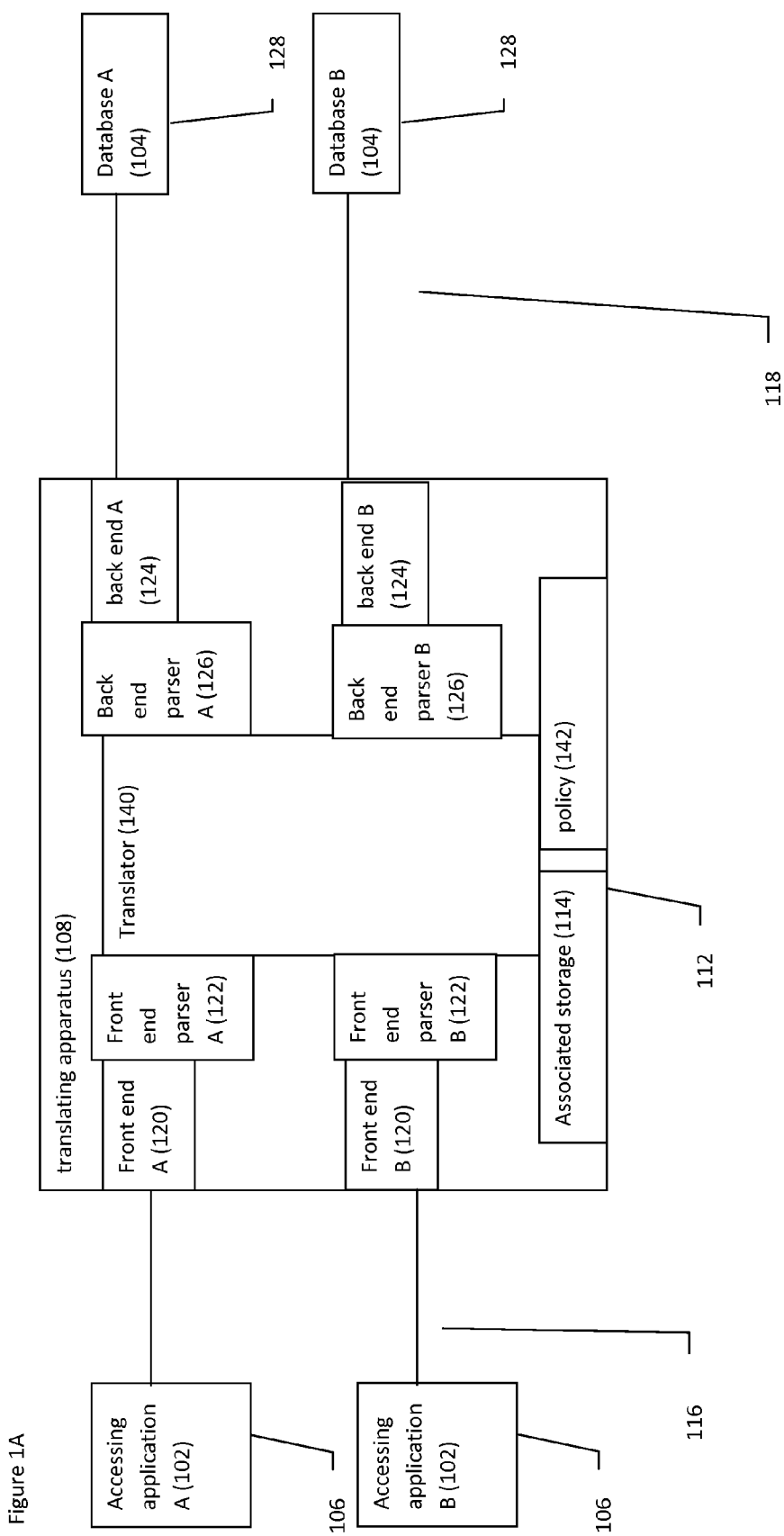
FIGS. 1A and 1B show exemplary, illustrative non-limiting systems for translation database queries and results through a translating apparatus that is separate from the database, according to some embodiments of the present invention.
Figure 1B:
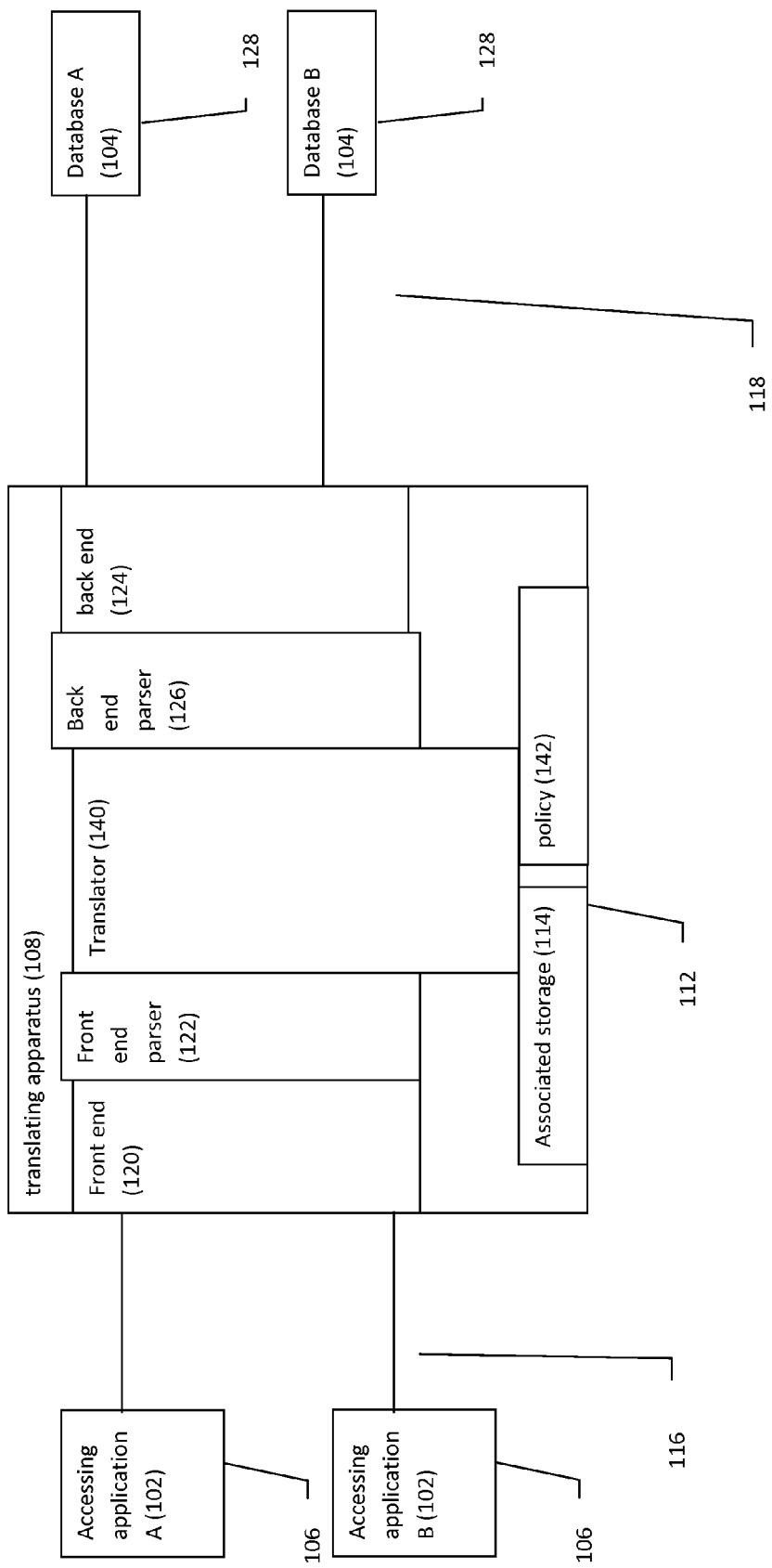

Referring now to the drawings, FIGS. 1A and 1B show exemplary, illustrative non-limiting systems for translation database queries and results through a translating apparatus that is separate from the database, according to some embodiments of the present invention. As shown in FIG. 1A, a system 100 features a plurality of accessing applications 102 for providing a software application interface to access one or more of a plurality of databases 104. Two accessing applications 102, A and B, are shown; as are two databases 104, A and B, for the purpose of illustration only and without any intention of being limiting.

Accessing application 102 may optionally be any type of software, or many optionally form a part of any type of software, for example and without limitation, a user interface, a back-up system, web applications, data accessing solutions and data warehouse solutions. Accessing application 102 is a software application (or applications) that is operated by some type of computational hardware, shown as a computer 106. However, optionally computer 106 is in fact a plurality of separate computational devices or computers, any type of distributed computing platform and the like; nonetheless, a single computer is shown for the sake of clarity only and without any intention of being limiting.

Similarly, database 104 is a database software application (or applications) that is operated by some type of computational hardware, shown as a computer 128. Again, optionally computer 128 is in fact a plurality of separate computational devices or computers, any type of distributed computing platform and the like; nonetheless, a single computer is shown for the sake of clarity only and without any intention of being limiting.

In a typical prior art system, accessing application 102 would communicate directly with database 104, and would therefore need to be able communicate in the query language and according to the query protocol for database 104. However, in this illustrative embodiment of the present invention, accessing application 102 communicates with database 104 through a translating apparatus 108. As described in greater detail below, translating apparatus 108 preferably receives database queries from accessing application 102, which would otherwise have been sent directly to database 104. Translating apparatus 108 therefore preferably acts as a forwarding solution for database 104.

Translating apparatus 108 is shown as being operated by a computer 112, but in fact could optionally be implemented as software (by computer 112 for example), hardware, firmware or a combination thereof. Again, if present, optionally computer 112 is in fact a plurality of separate computational devices or computers, any type of distributed computing platform and the like; nonetheless, a single computer is shown for the sake of clarity only and without any intention of being limiting.

Translating apparatus 108 preferably comprises a plurality of front ends 120, of which two are shown (A and B) for the purpose of description only and without wishing to be limiting in any way, for receiving queries from the respective accessing application 102 A or B. Each front end 120, A or B, is preferably accessed through a particular port or address, which may optionally be an IP address for example, such that accessing application 102 (A or B) sends database queries to the particular port or address through which the particular front end 120, A or B, is accessible. For the embodiment shown, front end 120 preferably does not need to analyze the received query in order to determine the database software and/or protocol and/or language that is suitable for the query.

Each front end 120 preferably comprises a front end parser 122, shown as A or B, for parsing queries received from accessing application 102 into a general format and for returning the results of a query in the proper language, protocol, format etc to accessing application 102. Optionally front end parser 122 operates only to prepare the results of the query and does not operate on the query itself. It should be noted that optionally and preferably, accessing application 102 does not need to be adjusted in any way, apart from transmitting queries to a particular port or address; instead, accessing application 102 is preferably implemented as for any other prior art system. Thus, accessing application 102 could optionally be a legacy application, for example, which does not necessarily need to be adjusted for interoperation with system 100.

The query is preferably passed to a translator 140. According to the information provided with the query, translator 140 determines to which database 104 (in this example, A or B), the query is to be directed and then translates the query to the specific language of the particular database 104 A or B, according to the specific software implementation of database 104 A or B (for example, a particular implementation of SQL). The translated query is then sent to an appropriate back end parser 126, which is operated by an appropriate back end 124, as determined according to information received by translator 140 with the query. Back end parser 126 prepares the translated query according to any requirements of the receiving database 104. Back-end 124 then preferably sends the translated query to database 104. For example, back end parser 126 A receives translated queries intended for database 104 A, prepares the queries accordingly, and transfers the queries to back end 124 A, which then sends the prepared queries to database 104 A.

Database 104 then preferably sends the results of the query to the appropriate back-end 124, at which point the process is preferably repeated in reverse, as described in greater detail below.

Also as described in greater below, in some cases, translator 140 is unable to translate all or part of the query, in which case the query (in whole or in part) is passed to the appropriate back end parser 126 without translation. Back end parser 126 may still need to prepare at least some aspects of the query for transfer to the appropriate database 104.

Optionally, the translated query and/or any portions thereof (for example during the translation process) is stored, at least temporarily, in an associated storage 114, which could optionally be implemented as some type of memory (and/or optionally as a portion of memory of computer 112, for example if shared with one or more other applications, in which an area is dedicated to storage of such queries). Also, in cases where at least a portion of the query cannot be translated (for example, as described in greater detail below with regard to raw data or binary data), optionally a message indicating the nature of the non-translated portion and how to read or otherwise access it is stored in associated storage 114; preferably, however, such a message is stored in database 104 itself. Other types of data and information, including but not limited to any type of policy, stored parameters etc may optionally be stored in associated storage 114 but are preferably stored in database 104.

Also optionally and preferably, the determination of the appropriate database 104 (and hence the appropriate back end parser 126 and back end 124) is determined according to a policy 142. For example, translator 140 may optionally be able to look up the appropriate identity of the back end 124 through policy 142. Such flexibility also enables the exact type and/or port or address of databases 104 to be determined according to information stored in policy 142. Also, optionally back end 124 is able to locate the appropriate port or address through policy 142, for transmitting the translated query.

Translating apparatus 108, accessing application 102 and database 104 preferably communicate through some type of computer network, although optionally different networks may communicate between accessing application 102 and translating apparatus 108 (as shown, a computer network 116), and between translating apparatus 108 and database 104 (as shown, a computer network 118). For example, computer network 116 may optionally be the Internet, while computer network 118 may optionally comprise a local area network, although of course both networks 116 and 118 could be identical and/or could be implemented according to any type of computer network.

In this embodiment of the system 100 according to the present invention, translating apparatus 108 preferably is addressable through both computer networks 116 and 118; for example, translating apparatus 108 could optionally feature an IP address for being addressable through either computer network 116 and/or 118.

Database 104 may optionally be implemented according to any type of database system or protocol; however, according to preferred embodiments of the present invention, database 104 is implemented as a relational database with a relational database management system. Non-limiting examples of different types of databases include SQL based databases, including but not limited to MySQL, Microsoft SQL, Oracle SQL, PostgreSQL, and so forth.

Optionally and preferably, system 100 may comprise a plurality of different databases 104 operating according to different database protocols and/or query languages and/or even having different structures. However, system 100 is also useful for a single database 104 (or multiple databases 104 of a single type, having a common database protocol, structure and/or query language), in that system 100 permits complete flexibility with regard to accessing application 102 and database 104; these two components do not need to be able to communicate with each other directly. As previously described, this lack of a requirement for direct communication may optionally be useful, for example, for legacy systems, or indeed for any system in which it is desirable to remove this requirement. Furthermore, this lack of a requirement may optionally be useful for organizations which have knowledge and skills with regard to particular types of database protocols, languages and/or software, but which may lack knowledge with regard to one or more other types.

These embodiments with regard to different database types and non-limiting examples of advantages may also optionally be applied to any of the embodiments of the system according to the present invention as described herein.

FIG. 1B shows a similar system to FIG. 1A, except that a single front end 120 and front end parser 122, and a single back end 124 and back end parser 126, are provided. As shown, all accessing applications 102 transmit queries to translating apparatus 108 and receive results from translating apparatus 108 through single front end 120 and front end parser 122. Furthermore, all databases 104 communicate with translating apparatus 108 through a single back end 124 and back end parser 126. Each of front end 120 and back end 124 preferably analyzes communications received from accessing application 102 or database 104, respectively, to determine the proper format for translation. Again policy 142 is used to determine the format to which the query/results should be translated, according to the recipient database 104/accessing application 102, respectively.

Figure 2A:
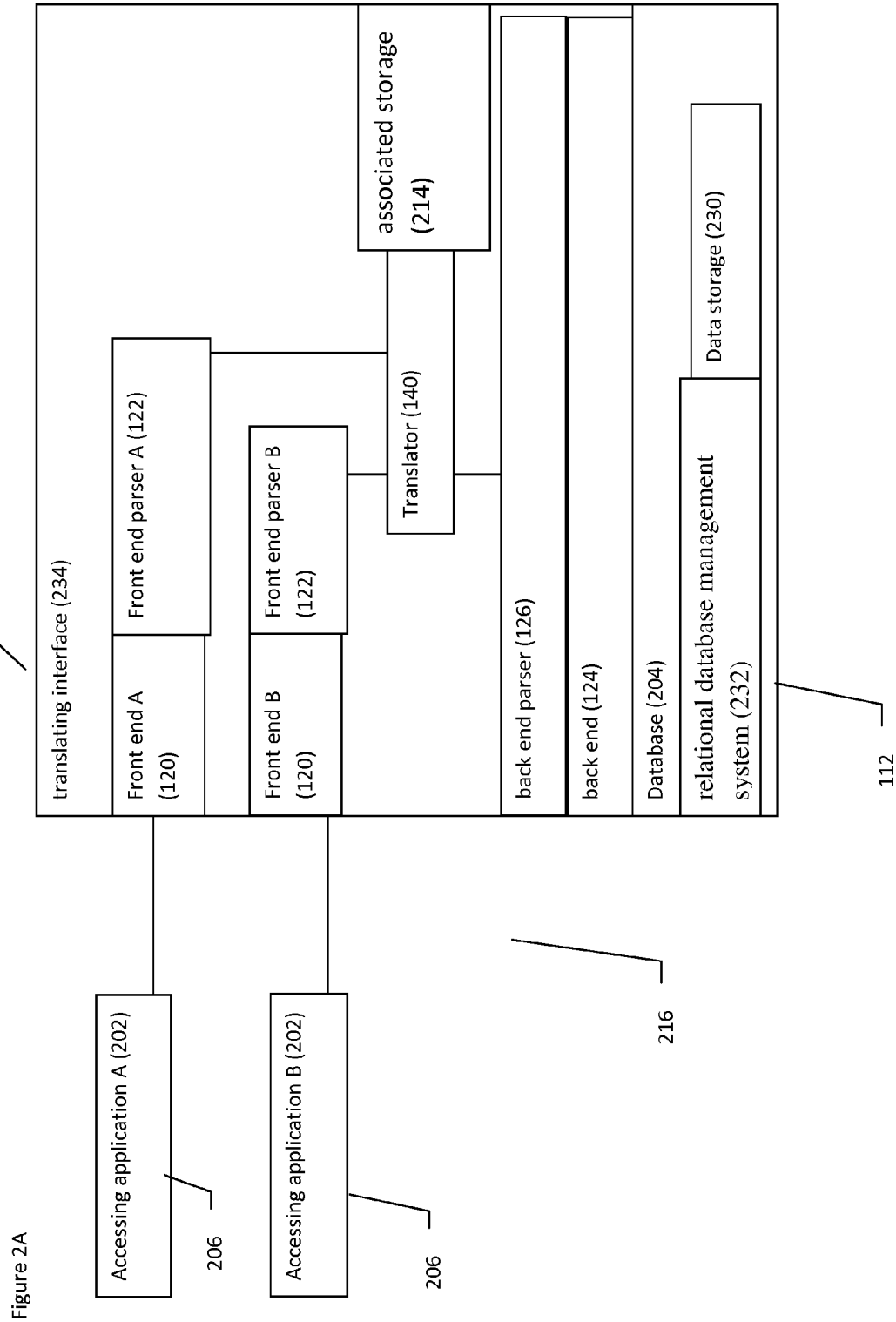
FIGS. 2A and 2B show alternative, illustrative exemplary systems according to at least some embodiments of the present invention, in which the translating apparatus is incorporated within the database.
Figure 2B:
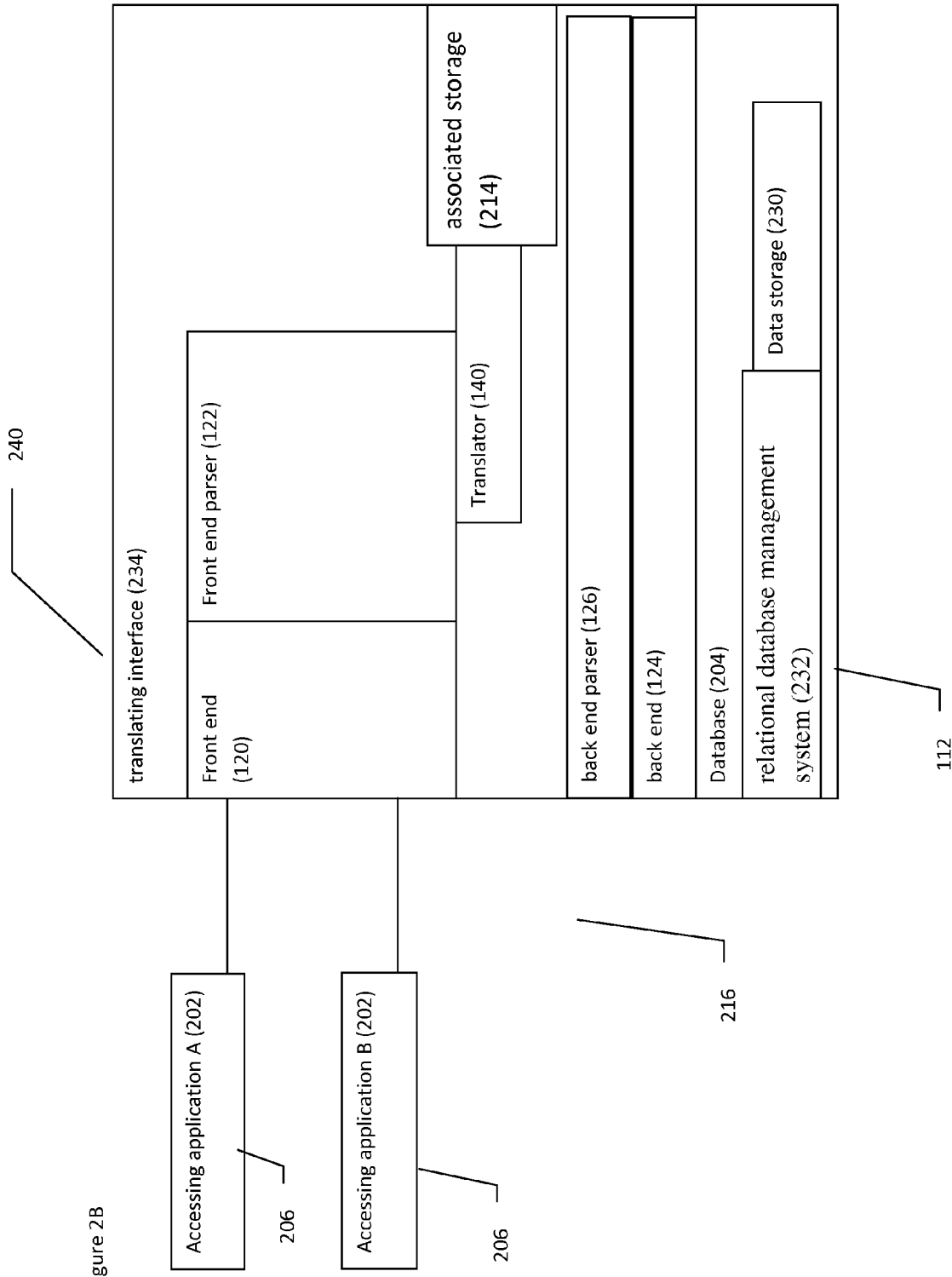

FIGS. 2A and 2B show alternative, illustrative exemplary systems according to at least some embodiments of the present invention, in which the translating apparatus is incorporated within the database, such that the translating apparatus is operated by the same hardware as the database; the hardware may optionally be a single hardware entity or a plurality of such entities. For this exemplary system, the database is shown as a relational database with a relational database management system for the purpose of illustration only and without any intention of being limiting. Components with the same or similar function are shown with the same reference number plus 100 as for FIG. 1A or 1B.

As shown with regard to FIG. 2A, system 200 again features a plurality of accessing applications 202, of which two are shown, accessing applications 202 A and B, but in this case these accessing applications 202 are addressing a single database 204. Database 204 is preferably implemented as a relational database, with a data storage 230 having a relational structure and a relational database management system 232. Accessing application 202 addresses database 204 according to a particular port; however, as database 204 is operated by a server 240 as shown, accessing application 202 sends the query to the network address of server 240.

Unlike for the system of FIG. 1A, a translating interface 234 is preferably running over the same hardware as database 204, optionally by single server 240 as shown or alternatively through distributed computing, rather than being implemented as a separate apparatus. Front end 120 A or B again receives queries from accessing applications 202 A or B, respectively, each of which is preferably addressable as previously described through a particular port or address. Translator 140 again translates the queries and the respective results, as previously described. The operation is preferably substantially similar to that of the translating apparatus of FIG. 1A.

Translating interface 234 and accessing application 202 preferably communicate through a computer network 218, which may optionally be implemented according to any type of computer network as described above. Also as noted above, accessing application 202 sends the query for database 204 to the network address of server 240. The query is sent to a particular port; this port may optionally be the regular or "normal" port for database 204, in which case translating interface 234 communicates with database 204 through a different port. Otherwise, accessing application 202 may optionally send the query to a different port for translating interface 234, so that translating interface 234 communicates with database 204 through a different port.

Preferably, translating interface 234 receives queries through a particular port for each database type. By "database type" it is meant a particular combination of database structure, protocol and query language; databases of the same database type can communicate freely without translation. For example, one database type could optionally be a relational database operated by MySQL, while another database type could optionally be a relational database operated by MS (Microsoft) SQL. Queries for each such type are preferably received through a different port, which accessing application 202 is more preferably configured to access. Optionally there could be a generic port for any non pre-configured database types.

FIG. 2B shows a similar system as to FIG. 2A, except that there is a single front end 120 and a single front end parser 122, which analyzes the received queries to determine how they should be translated by translator 140, and which also prepares the results for transmission back to the requesting accessing application 202.

FIG. 3 is a flowchart of an exemplary, illustrative method for operation of a translating apparatus or interface according to at least some embodiments of the present invention, with interactions between the accessing application, translating apparatus or interface, and the database. Arrows show the direction of interactions. As shown, in stage 1, a query is transmitted from some type of query generating application, shown as the accessing application as a non-limiting example only, and is sent to the translating apparatus or interface, preferably to a particular front end being addressed through a particular port or address, according to the specific query generating application. As described above, the query generating application may optionally be any type of application, such as for example the accessing application of FIG. 1 or 2.

In stage 2, the front end preferably passes the query to the translation mechanism for translation, preferably with information regarding the query and the identity of the query generating application. In stage 3, the translated query is provided to the back end and back end parser, for preparation for transmission to the specific database to which query is to be addressed. In stage 4, the translated query is sent to the back end database that is being used to stored the data. In stage 5, the retrieved data is returned to the translating apparatus or interface. In stage 6, the translating apparatus or interface, if necessary, translates the received data. In stage 7, the front end parser converts the retrieved, translated data to a format which is useable by the accessing application. In stage 8, the retrieved data is returned to the query generating application by the front end.

The below relates to a non-limiting example of translation of a query from MySQL to PostgreSQL, and then the response is translated back from PostgreSQL to MySQL.

Translation between MySQL to PostgreSQL:

An SQL command is received from an application which sends this query command to a MySQL Database:

```
CREATE TABLE table2(table2_id bigint PRIMARY KEY
auto_increment,descr char(50),table1_id bigint NOT NULL
REFERENCES table1(table1_id) ON UPDATE CASCADE
ON DELETE CASCADE);
```

The query is parsed and analyzed by the translation mechanism, according to the policy, and this command is sent to the back end PostgreSQL Database:

```
CREATE TABLE table2(table2_id SERIAL PRIMARY
KEY,descr char(50),table1_id bigint NOT NULL
REFERENCES table1(table1_id) ON UPDATE CASCADE
ON DELETE CASCADE);
```

The PostgreSQL replies to the translation apparatus with the below response:

> NOTICE: CREATE TABLE will create implicit sequence "table2_table2_id_seq" for serial column "table2.table2_id"
> NOTICE: CREATE TABLE / PRIMARY KEY will create implicit index "table2_pkey" for table "table2"
> CREATE TABLE The translation apparatus replies with these commands in a MySQL format: Query OK, 0 rows affected (0.03 sec)

The below is a non-limiting, illustrative example of advanced translation between PostgreSQL to MySQL.

An SQL command is received from an application which sends this query command to a PostgreSQL Database:

> DECLARE curs1 SCROLL CURSOR WITH HOLD
> FOR SELECT table2.table2_id as ID,table1.table1_id
> as TypeID, table1.name as TypeName,table2.descr
> as Description FROM table1,table2 where
> table1.table1_id=table2.table1_id;
> FETCH FORWARD 5 from curs1;

The query is parsed and analyzed by the translation mechanism, according to the policy, and this command is sent to the back end in MySQL:

> DELIMITER $$
> CREATE PROCEDURE curdemo( ) BEGIN DECLARE
> done BOOLEAN DEFAULT 0; DECLARE i INT
> DEFAULT 0;DECLARE ID varchar(255); DECLARE
> TypeID varchar(255); DECLARE TypeName
> varchar(255); DECLARE Descr varchar(255); DECLARE
> curs1 CURSOR FOR SELECT table2.table2_id as
> ID,table1.table1_id as TypeID,table1.name as
> TypeName,table2.descr as Description FROM table1,table2
> where table1.table1_id=table2.table1_id; DECLARE
> CONTINUE HANDLER FOR SQLSTATE '02000' SET
> done=1; OPEN curs1; REPEAT FETCH curs1 into
> ID,TypeID,TypeName,Descr; select
> ID,TypeID,TypeName,Descr; SET i=i+1; UNTIL done or
> i=5 END REPEAT; close curs1; END$$
> DELIMITER ;
> call curdemo;
> DROP PROCEDURE curdemo( );

The MySQL database replies to the translation apparatus: Query OK, 0 rows affected (0.00 sec)

In this example, the "fetch backward" command doesn't exist in MySQL, so the translation apparatus places the data into temp variables or temp table and then echoes it to screen. The translation apparatus then replies with these commands in a PostgreSQL format, as shown by the below table:

| id | typeid | typename | description |
|----|--------|----------|-------------|
| 1  | 1      | name1    | descr1      |
| 2  | 1      | name1    | descr2      |
| 3  | 1      | name1    | descr3      |
| 4  | 2      | name2    | descr1      |
| 5  | 2      | name2    | descr2      |

Figure 4:
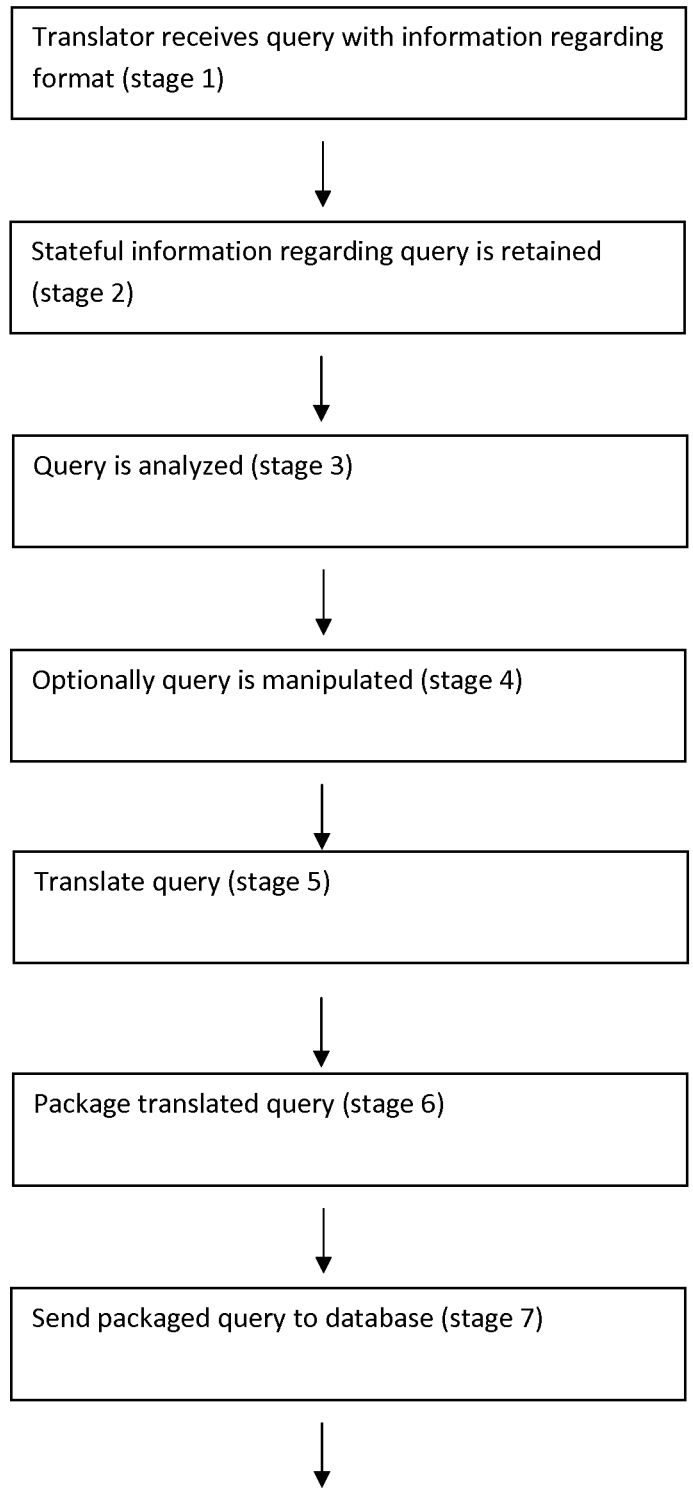
FIG. 4 is a flowchart of an exemplary, illustrative method for translations of database queries/results according to at least some embodiments of the present invention.

FIG. 4 is a flowchart of an exemplary, illustrative method for translations of database queries/results according to at least some embodiments of the present invention. As shown, in stage 1, the translator (whether an apparatus or interface) receives a database query, preferably with information regarding the query, optionally and more preferably including one or more of the identity of the querying application, the type of the requesting application, the database protocol and/or language and/or software, and also the identity of the front end which is to receive the translated database results.

In stage 2, stateful information regarding the query is preferably retained, in order to enable the results to be provided to the correct querying application, for example as described above with regard to the information received with the query.

In stage 3, the query is preferably analyzed, to determine whether one or more parts of the query may or may not be translated. Also preferably the analysis determines whether the query is read only, or includes writing and/or updating.

In stage 4, optionally one or more parts of the query are manipulated, if they cannot be translated directly, preferably as determined according to the above analysis stage. As a non-limiting example, if the query features binary data that cannot be translated, then this stage prepares the binary data so that it can be sent directly to the database, preferably with a message indicating the nature of the binary data and how to read it (for example, the type of application that is able to read the binary data). As another non-limiting example, if the query is "chained" or features a plurality of linked queries, the query is preferably decomposed to these smaller queries.

In stage 5, one or more parts of the query are translated. In stage 6, the translated query is packaged for being sent to the database, for example by preparing the query according to the required format for the database and/or by providing any necessary auxiliary information. In stage 7, the packaged query is sent to the database.

In stage 8, the results are received as an answer from the database. The answer is then translated in stage 9, optionally with one or more parts of the results not being translated for the reasons described herein. In stage 10, the translated results are packaged for being sent. In stage 11, the packaged results are sent to the querying application.

The above described translating apparatus (or interface) is preferably able to operate with multiple different types of databases. Non-limiting examples of different types of databases include 3D databases, flat file databases, hierarchical databases, object databases or relational databases, including the various types described above. The translating apparatus (or interface) is preferably also adjusted for different types of database languages for any given type of database as described herein.

Figure 5A:
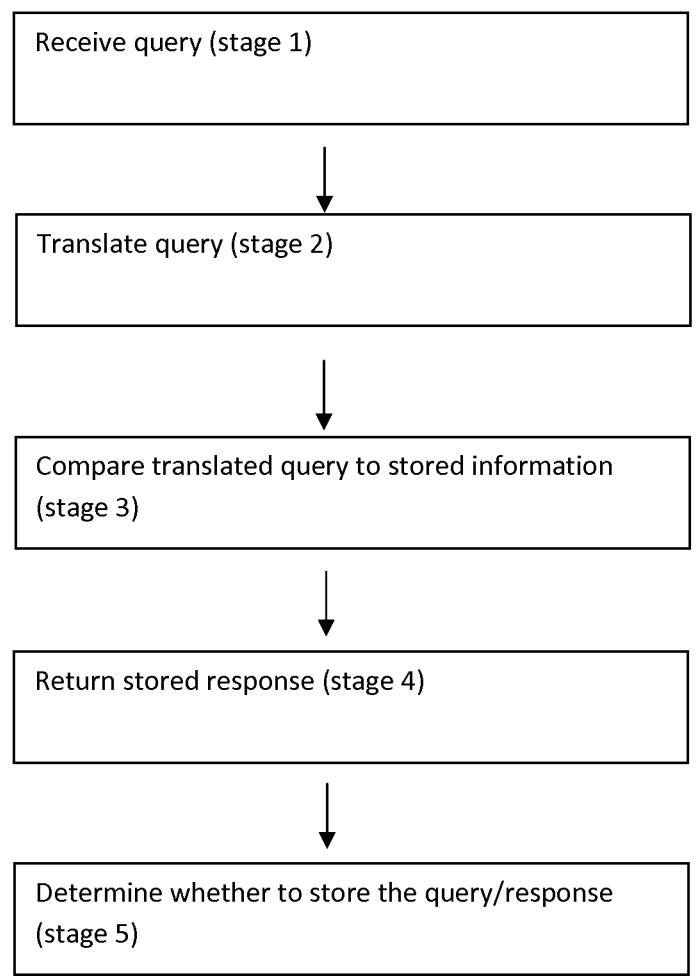
FIG. 5 relates two different exemplary embodiments of a combined smart caching and translation process according to the present invention.
Figure 5B:
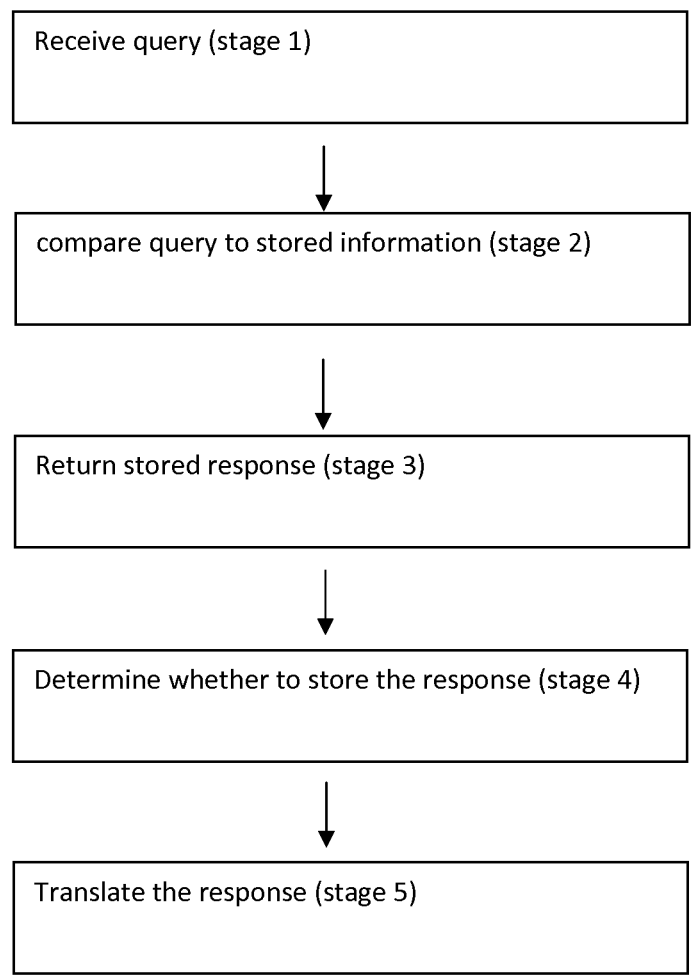

FIG. 5 relates two different exemplary embodiments of a combined smart caching and translation process according to the present invention. The smart caching process and system may optionally be implemented as described with regard to the concurrently filed U.S. Provisional Application entitled "Smart database caching", owned in common with the present application and having at least one inventor in common, which is hereby incorporated by reference as if fully set forth herein. FIG. 5A shows an exemplary, illustrative process for translation before smart caching, while FIG. 5B shows an exemplary, illustrative process for translation after smart caching.

Turning now to FIG. 5A, as shown, in stage 1, a query is received, indicating both the original query language and format, and also the query language/format for the intended receiving database. In stage 2, the query is translated into the query language/format for the intended receiving database as described herein according to any of the embodiments of the present invention.

In stage 3, the translated query is compared to stored query/response pairs by the smart caching apparatus (or interface). In stage 4, if the translated query is found to have a stored response, then that response is returned back to the querying application (optionally with translation if necessary, although of course the response could be stored in the desired form for the querying application). Otherwise in stage 5, the process described in the concurrently filed US Provisional Application is performed for determining whether to store the query/response pair. Optionally any such process may be performed, but preferably a process is performed which enables the query/response pair to be stored according to one or more rules, including but not limited to popularity, security, type of information provided, type of database and so forth.

FIG. 5B shows an exemplary, illustrative process for translation after smart caching. As shown, in stage 1, as for FIG. 5A, a query is received, indicating both the original query language and format, and also the query language/format for the intended receiving database.

In stage 2, the non-translated query (ie the query as received) is compared to stored query/response pairs by the smart caching apparatus (or interface). In stage 3, if the query is found to have a stored response, then that response is returned back to the querying application (optionally with translation if necessary). Otherwise in stage 4, the process described in the concurrently filed US Provisional Application is performed for determining whether to store the query/response pair. Optionally any such process may be performed, but preferably a process is performed which enables the query/response pair to be stored according to one or more rules, including but not limited to popularity, security, type of information provided, type of database and so forth.

In stage 5, at least the response is translated, for example to the language of the querying application, before being returned to the querying application. However, preferably the query and the response are not translated before being stored.

While the invention has been described with respect to a limited number of embodiments, it will be appreciated that many variations, modifications and other applications of the invention may be made.

What is claimed is:

1. A method for translating of queries for interaction with a plurality of different database types, comprising: providing a plurality of specific front ends, each front end relating to a specific query language, and a plurality of specific back ends, each back end relating to a specific query language, and a translating apparatus for translating between query languages; sending a query by an accessing application to one of said plurality of front ends at said translating apparatus; receiving said query by said translating apparatus to form a received query; translating said received query to a specific query language of a database to which said query is to be addressed to form a database query; and sending said database query in said specific query language by one of the specific back ends to said database; wherein said receiving said query by said translating apparatus comprises determining a query language of said received query and a query language of said database query; wherein said translating said query comprises analyzing said query; decomposing said query into a plurality of query portions; and not translating at least one portion; wherein said sending said query comprises sending said non-translated portion to said database as raw data; wherein said sending said non-translated portion further comprises also sending a message indication at least one parameter of said raw data.

2. The method of claim 1, wherein said determining said query language of said received query comprises analyzing said query language of said received query.

3. The method of claim 1, wherein said determining said query language of said received query comprises detecting a port or address receiving said query.

4. The method of claim 3, wherein each of said plurality of specific front ends comprises a specific port or address.

5. The method of claim 1, wherein said translation apparatus for translating said query is separate from said database.

6. The method of claim 1, wherein said translation apparatus comprises a translation interface operated by the same hardware as said database.

7. The method of claim 1, wherein said database comprises a plurality of databases, of which at least one has a different format, database protocol, structure and/or query language.

8. The method of claim 1, further comprising translating said results and passing said translated results to said accessing application by said one of said plurality of front ends.

9. The method of claim 1, wherein said translating said query further comprises determining whether said translated query and response are stored at a storage outside of said database; and if so, returning said response stored at said storage outside of said database.

10. The method of claim 1, wherein said query languages comprise SQL.

11. The method of claim 1, wherein said query languages are limited to SQL.

12. A system for translating of queries for interaction with a plurality of different database types, comprising: a plurality of databases of at least two different database types running on a plurality of servers; an accessing application running on at least one computer for sending a query; a translation apparatus running on at least one server for receiving said query, for determining a query language of said received query, for determining the receiving database from at least one of said plurality of databases, for determining a query language of said receiving database, for translating said query according to requirements of said receiving database, and for sending said translated query to said receiving database, wherein said translation apparatus comprises a plurality of specific front ends, each front end relating to a specific query language, and wherein said query is received by one of said front ends; wherein said translating said query by said translation apparatus comprises analyzing said query; decomposing said query into a plurality of query portions; and not translating at least one portion; wherein said sending said query by said translation apparatus comprises sending said non-translated portion to said receiving database as raw data; wherein said sending said non-translated portion further comprises also sending a message indication at least one parameter of said raw data.

13. The system of claim 12, wherein said translation apparatus further comprises a back end for providing said query to said database.

14. The system of claim 13, wherein said query languages comprise SQL.

15. The system of claim 13, wherein said query languages are limited to SQL.

* * * * *